(12) United States Patent
Kazuo

(10) Patent No.: US 11,237,456 B2
(45) Date of Patent: Feb. 1, 2022

(54) BLADE DRIVING DEVICE, CAMERA AND PORTABLE ELECTRONIC DEVICE

(71) Applicant: AAC Optics Solutions Pte. Ltd., Singapore (SG)

(72) Inventor: Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 159 days.

(21) Appl. No.: 16/719,942

(22) Filed: Dec. 18, 2019

(65) Prior Publication Data
US 2020/0292915 A1    Sep. 17, 2020

(30) Foreign Application Priority Data

Mar. 12, 2019   (JP) .............................. JP2019-044429

(51) Int. Cl.
  *G03B 9/22*   (2021.01)
  *G06F 1/16*   (2006.01)
  *H04N 5/225*  (2006.01)

(52) U.S. Cl.
  CPC ............. *G03B 9/22* (2013.01); *G06F 1/1605* (2013.01); *G06F 1/1626* (2013.01); *H04N 5/2254* (2013.01)

(58) Field of Classification Search
  CPC .................................... G03B 9/08; G03B 9/22
  See application file for complete search history.

(56) References Cited

U.S. PATENT DOCUMENTS 5,150,702 A * 9/1992 Miyanaga .......... A61B 1/00096
                                                348/362

* cited by examiner

*Primary Examiner* — Minh Q Phan
(74) *Attorney, Agent, or Firm* — W&G Law Group

(57) ABSTRACT

An object of the present disclosure lies in that in an optical device including a blade mounted on a lens or in space in a lens, it is possible to achieve miniaturization and light weight of the entire equipped device, simplification of driving and simplification of assembling, by using a shape memory alloy in a driving portion. A blade driving device includes: a base member supporting a blade; a blade; a plate member having a caliber and constituting a blade chamber; a plate member having a caliber, constituting the blade chamber and covering the blade; a ring member rotatably shaft-supported and including a connecting portion connected to the blade; an elastic member held by the base member and the ring member; a shape memory alloy held by the base member and the ring member; a holding member for holding the shape memory alloy; and a wiring for power supply.

8 Claims, 3 Drawing Sheets

BLADE DRIVING DEVICE, CAMERA AND PORTABLE ELECTRONIC DEVICE

TECHNICAL FIELD

The present disclosure relates to a blade driving device or the like for a camera device or the like.

BACKGROUND

With the rapid development of photographic technology, blade driving devices and lens driving devices are widely used in numerous photographic devices. Applying optical devices having a blade driving device to various portable electronic devices, such as portable telephones, tablets, etc., is particularly acceptable to consumers.

The blade driving device is a device that drives a single or multiple blades to change a state of an opening, and is used as a shutter, an aperture, a shutter and aperture, a filter or the like in various optical units such as a camera. When a blade driving device equipped on a lens driving device or the like or in a lens driving device is applied on an optical device in which lenses are movable, due to a size and a weight of a driving portion of the blade driving device, protruding portions in multiple directions depending on the assembly direction and the like, the blade driving device may hinder the operation or configuration of the lens driving device.

Although there is a moving unit using a shape memory alloy occupying a small area in structure, it is necessary to increase a length of the shape memory alloy when a relatively large amount of change is required.

In addition, when using the shape memory alloy, in the case where one of two end portions is directly fixed to a member for driving a blade, it must be movable together with an energization path, thereby requiring an inefficient space having such an amount that the energization path can move. In addition, the energization path may become an interference factor exceeding a necessary stretching amount, and thus it is possible to affect the driving of the member for driving a blade.

Therefore, it is necessary to provide a new blade driving device that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
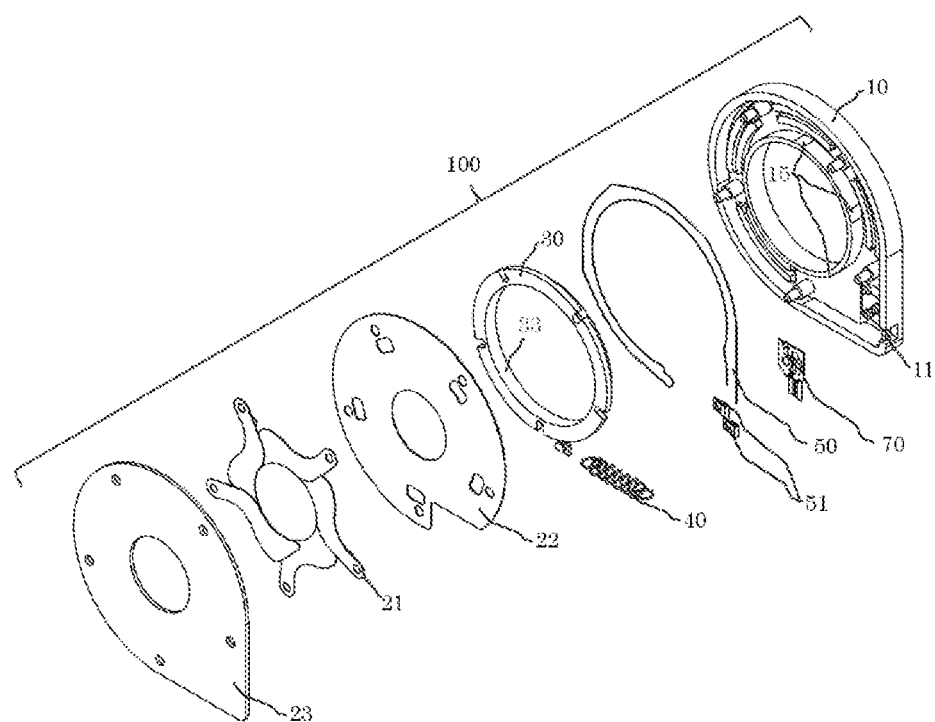
FIG. 1 is an exploded perspective diagram of a blade driving device according to the present disclosure.
Figure 2:
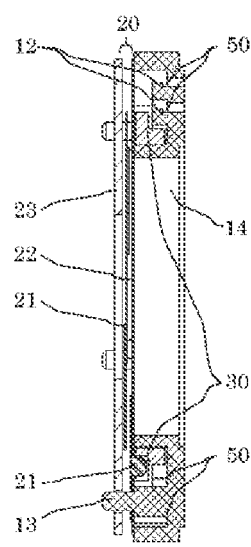
FIG. 2 is a cross-sectional diagram of a blade driving device according to the present disclosure.
Figure 3:
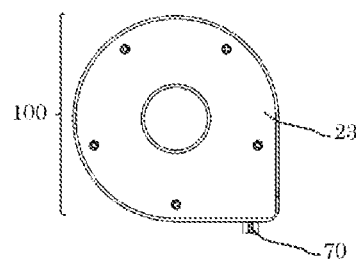
FIG. 3 is a front view of a blade driving device according to the present disclosure.
Figure 4:
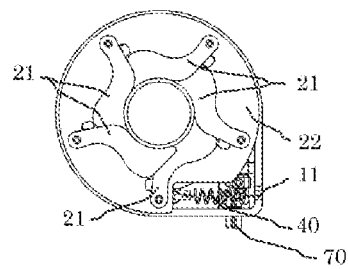
FIG. 4 is a front view of a blade driving device according to the present disclosure having a plate member, which has a caliber, constitutes a blade chamber and covers a blade, removed.
Figure 5:
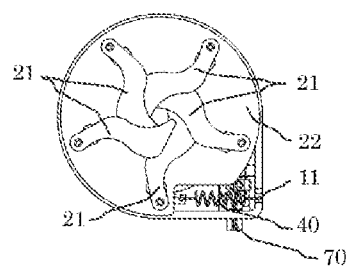
FIG. 5 is a front view of a blade driving device according to the present disclosure having a plate member, which has a caliber, constitutes a blade chamber and covers a blade, removed, and is a diagram having a blade member closed.
Figure 6:
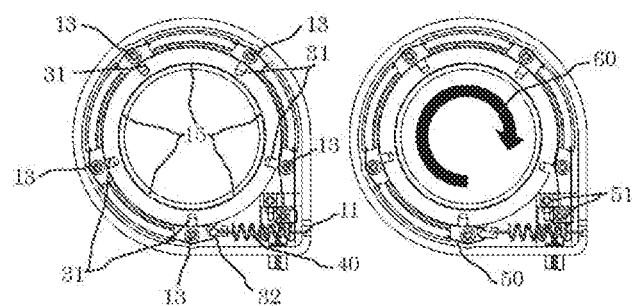
FIG. 6 illustrates states of a shape memory alloy, an elastic member and a ring member when the shape memory alloy of a blade driving device according to the present disclosure expands and contracts.
Figure 7:
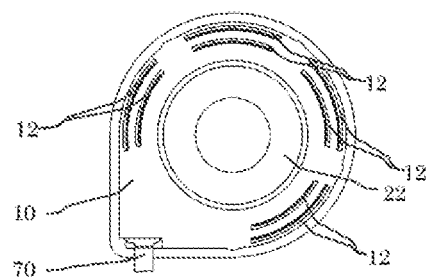
FIG. 7 is a rear view of a blade driving device according to the present disclosure.
Figure 8:
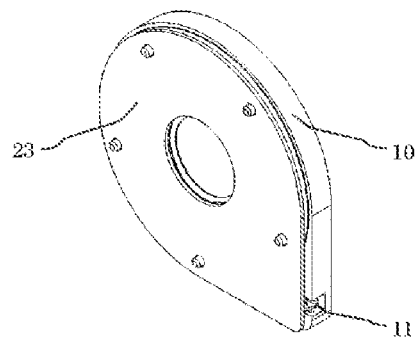
FIG. 8 is a three-dimensional view of a blade driving device according to the present disclosure.

The present disclosure will be further illustrated with reference to the accompanying drawings and the embodiments.

FIGS. 1 to 7 are diagrams showing a blade driving device 100 according to the present disclosure.

The blade driving device 100 includes: a base member 10 supporting a blade; a blade 21; a plate member 22 having a caliber and constituting a blade chamber; a plate member 23 having a caliber, constituting the blade chamber and covering the blade; a ring member 30 that is rotatably shaft-supported and includes connecting portions 31 connected to the blade; an elastic member 40 held by the base member and the ring member; a shape memory alloy 50 held by the base member and the ring member; a holding member 51 for holding the shape memory alloy; and a wiring 70 for power supply.

In the blade chamber 20 constituting the blade, there are the blade 21, a plate member 22 having a caliber and constituting the blade chamber, and a plate member 23 having a caliber, constituting the blade chamber and covering the blade.

A driving portion of the blade driving device is provided with a sliding portion 33 of the ring member 30 that is rotatably shaft-supported and has a connecting portion 31 connected to the blade, the elastic member 40 held by the ring member and engaging with a wall for sliding 15 and provided on the base member, the shape memory alloy 50 held by the base member and the ring member, the holding member 51 for holding the shape memory alloy, and the wiring 70 for power supply.

The elastic member 40 located on the blade driving device and held by the base member 10 and the ring member 30 is held by a protrusion 11 on the base member and a protrusion 32 on the ring member, rotates in a direction in which the elastic member 40 contracts and is applied with a force.

By applying thermal energy such as energization to the shape memory alloy 50 held by the base member 10 supporting the blade and by the ring member 30, the shape memory alloy 50 contracts along a groove 12 provided on the base member so as to rotate the ring member 30, thereby pulling the protrusion 32 provided on a ring portion of the ring member 30 for holding the shape memory alloy 50. For the blade 21 fixed by a shaft 13 provided at the base member and used for shaft-supporting the blade, the blade 21 is rotated by the connection portion 31 provided on the ring member 30 and connected to the blade, and is pushed towards the caliber, whereby the quantity of light can be changed.

The shape memory alloy 50 dissipates heat and expands by cutting off of the thermal energy such as energization, and thus is rotated and applied with a force in the direction in which the elastic member 40 contracts, such that the blade 21 is rotated back to the outside of the caliber.

In order to generate a relatively large amount of change, the shape memory alloy 50 is double wound in a circumferential direction of the base member 10. Then, the required amount of movement can be achieved due to extending of the total length.

Further, by fixing the holding member 51 for holding the shape memory alloy to the base member 10, the blade 21 or the ring member 30 having the connecting portion 31 connected to the blade does not require a fixing portion, such that the space can be utilized efficiently. Moreover, since it is not necessary to move together with the wiring 70 for power supply as an energization path, good driving can be achieved for the blade 21 connected to the ring member 30.

The ring member 30 having the connecting portion 31 connected to the blade may be engraved with, for example, an element or a groove for detecting the rotation of the ring, thereby detecting the rotation. This is a method for accurately detecting and controlling the position of the blade and is merely an example of detection.

These members are all assembled in one direction of the base member 10.

Space 14 for receiving the lens is provided inside the base member 10 and can be provided at a position with a narrow interval between this position and the lens.

Figure 9:
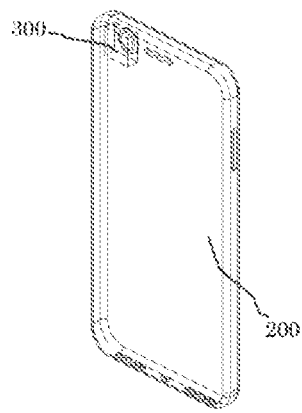
FIG. 9 illustrates a portable electronic device (a portable information terminal) equipped with a blade driving device according to the present disclosure and a lens driving device.

The above-described blade driving device 100 can also be used for a camera device 300 for a portable information device 200 such as a so-called smartphone shown in FIG. 9, a so-called functional phone or a tablet device.

The blade driving device 100 according to the present disclosure is a thin and lightweight driving device capable of freely changing the quantity of light of the opening caliber provided in the blade driving device. Therefore, even when the lens driving device is in an operation, the operation will not be interfered. In addition, easy assembling is achieved by assembling in one direction, thereby achieving an efficient blade driving device without interfering with lens driving, while improving the appropriate adjustment of the quantity of light based on the blade 21 and the quality of the captured image.

What has been described above is only an embodiment of the present disclosure, and it should be noted herein that one ordinary person skilled in the art can make improvements without departing from the inventive concept of the present disclosure, but these are all within the scope of the present disclosure.

SYMBOL DESCRIPTION

10 . . . base member
11 . . . protrusion on base member
12 . . . groove provided on base member
13 . . . shaft for shaft-supporting blade
14 . . . space for receiving lens
15 . . . wall for sliding
20 . . . blade chamber constituting blade
21 . . . blade
22 . . . plate member having caliber and constituting blade chamber
23 . . . plate member having caliber, constituting blade chamber and covering blade
30 . . . ring member
31 . . . connecting portion connected to blade
32 . . . protrusion on ring portion
33 . . . sliding portion
40 . . . elastic member
50 . . . shape memory alloy
51 . . . holding member for holding shape memory alloy
60 . . . rotation direction of ring member
70 . . . wiring for power supply
100 . . . blade driving device
200 . . . portable information device
300 . . . camera device

What is claimed is:

1. A blade driving device, comprising:
a plurality of blades;
a base member supporting the plurality of blades;
a ring member rotatably shaft-supported at the base member, the ring member comprising a connecting portion connected to the plurality of blades;
an elastic member held by the base member and the ring member; and
a shape memory alloy held by the base member and the ring member,
wherein the ring member is guided by the elastic member in a rotation direction of the ring member, two ends of the shape memory alloy are fixed to the base member,
by heating of the shape memory alloy, the blade driving device drives the ring member in a direction opposite to the rotation direction in which the ring member is guided by the elastic member, so as to drive the plurality of blades connected to the ring member.

2. The blade driving device as described in claim 1, wherein the shape memory alloy is wound in a circumferential direction of the base member.

3. The blade driving device as described in claim 1, wherein a plurality of walls for sliding is provided at a center of the base member and engages with a sliding portion provided at the ring member.

4. The blade driving device as described in claim 2, wherein a plurality of walls for sliding is provided at a center of the base member and engages with a sliding portion provided at the ring member.

5. The blade driving device as described in claim 1, wherein an optical device is assembled in one direction with respect to the base member.

6. The blade driving device as described in claim 2, wherein an optical device is assembled in one direction with respect to the base member.

7. A camera, comprising a blade driving device, the blade driving device comprising:
a plurality of blades;
a base member supporting the plurality of blades;
a ring member rotatably shaft-supported at the base member, the ring member comprising a connecting portion connected to the plurality of blades;
an elastic member held by the base member and the ring member; and
a shape memory alloy held by the base member and the ring member,
wherein the ring member is guided by the elastic member in a rotation direction of the ring member, two ends of the shape memory alloy are fixed to the base member.

8. A portable electronic device, comprising a camera comprising a blade driving device, the blade driving device comprising:
a plurality of blades;
a base member supporting the plurality of blades;
a ring member rotatably shaft-supported at the base member, the ring member comprising a connecting portion connected to the plurality of blades;
an elastic member held by the base member and the ring member; and
a shape memory alloy held by the base member and the ring member, wherein the ring member is guided by the elastic member in a rotation direction of the ring member, two ends of the shape memory alloy are fixed to the base member.

* * * * *